June 12, 1956
H. W. SIMPSON
2,749,775
PLANETARY TRANSMISSION FOR SELF-PROPELLED VEHICLE
Filed Dec. 27, 1951
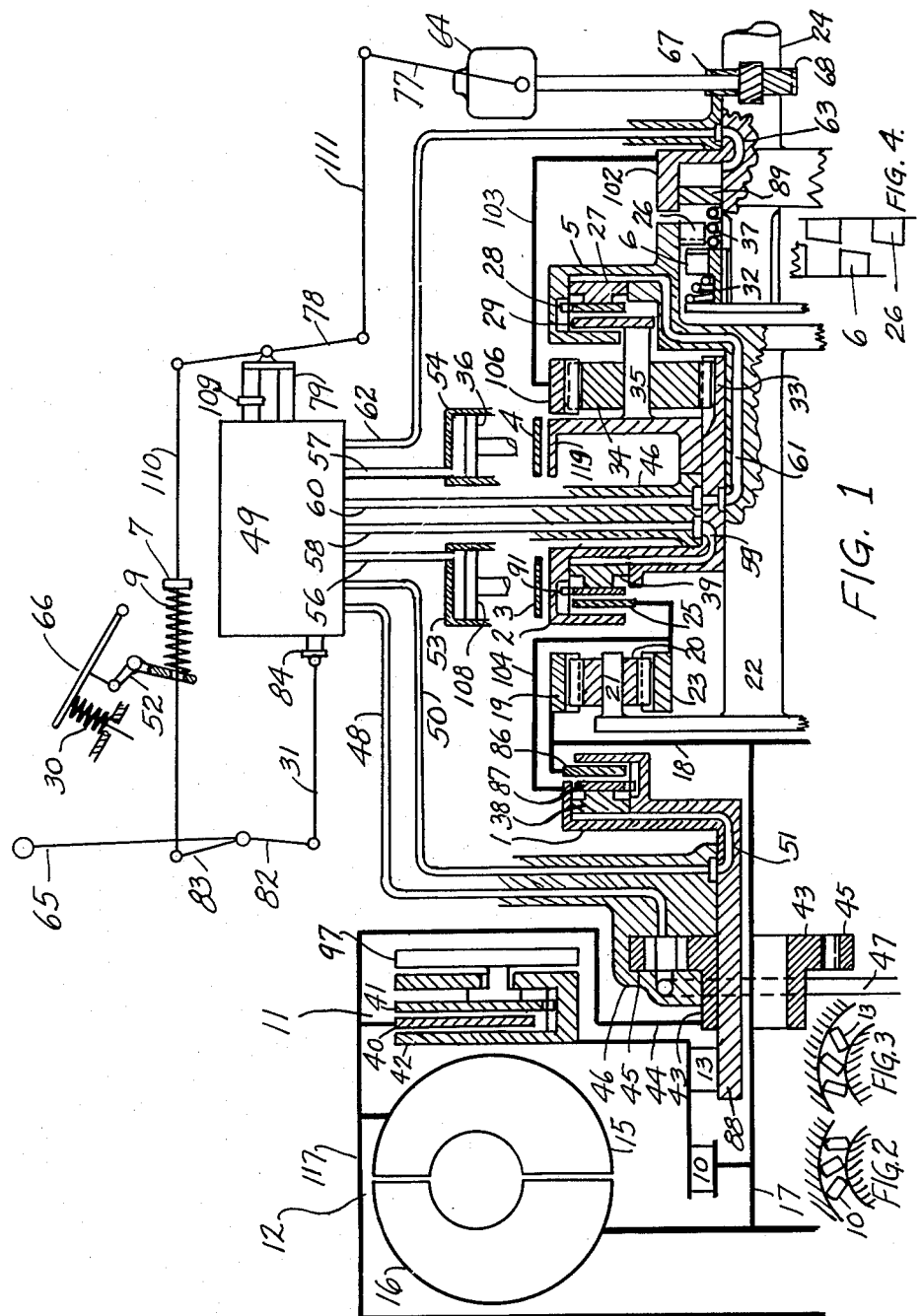
INVENTOR.
HOWARD W. SIMPSON.
BY
Farley, Forster & Farley
ATTORNEYS United States Patent Office 2,749,775
Patented June 12, 1956

2,749,775

PLANETARY TRANSMISSION FOR SELF-PROPELLED VEHICLE

Howard W. Simpson, Dearborn, Mich.

Application December 27, 1951, Serial No. 263,631

12 Claims. (Cl. 74—731)

This invention relates to an automatic planetary transmission with a hydraulic control and a hydrodynamic device of the fluid coupling type, designed to couple a source of power to the transmission in order to reduce impact on the gears caused by variations in either input or output torque. This application is a substitute for my prior application for United States Letters Patent, Serial No. 60,565, filed on November 17, 1948, now abandoned. The planetary gearing in this disclosure is similar to that in my copending United States patent application No. 482,102, filed January 17, 1955, for obtaining six speeds forward and one reverse, except that a centrifugal clutch by-passes the fluid coupling under certain conditions. Consequently, the gearing, centrifugal clutch, and the fluid coupling are indispensable to each other in obtaining the results for which this particular disclosure is designed.

A fluid coupling is desirable for obtaining a smooth start of a vehicle, but once the vehicle has come up to its normal speed, the hydraulic cushioning of the drive is no longer required, nor even desired, because there is a constant power loss due to hydraulic slip.

An object of this invention is therefore automatic co-operation of the planetary gearing, centrifugal clutch and the fluid coupling to enable the input to by-pass the latter when the transmission has come up to a fast enough speed for automatic controls to engage direct drive, and to revert to fluid coupling drive again when the vehicle speed becomes low.

Another object is to provide a simple hydraulic control system requiring only one pump instead of two as in most transmissions of this type.

Another object is to provide push starting of the vehicle engine without oil pressure in the hydraulic system, by virtue of the centrifugal clutch already mentioned.

Another object is to make the full power of the engine available on upgrades in all speeds by by-passing the fluid coupling by a direct connection between the engine and transmission after the transmission has previously been shifted through starting speed ratios.

Other forms of the various features, within the scope of the claims, are intended to also be included in this invention.

In order to acquaint those skilled in the art with the construction and operation of a transmission according to my invention I shall describe a preferred embodiment.

In the drawings, Fig. 1 is a diagrammatic vertical section of the transmission, hydraulic system and automatic controls. The transmission is shown in neutral or non-driving position except that clutch teeth 6 and 26 would be engaged.

Figs. 2 and 3 are partial end sectional views of one-way clutches 10 and 13, respectively, as viewed from the front or fluid coupling end, forward rotation being in a clockwise direction.

Fig. 4 is a partial top view of clutch teeth 6 and 26.

In Fig. 1, input shaft 14 is connected to impeller 15 of fluid coupling 12. Runner 16 transmits the torque to shaft 17 and through flange 18 to planetary ring gear 19.

Ring gear 19 is a member of the front set of planetary gears, planet gear 20 mounted on carrier 21 and sun gear 23 being other members of this front set. Only one planet is shown but three or more are actually used. The rear set of planetary gears, shown as consisting of sun gear 33, ring gear 106 and planet gear 34 also has three or more planet gears mounted on carrier 35.

Returning to the front set of gears, planet carrier 21 is integral with shaft 22. Clutch disc 86 is connected to ring gear 19 and sliding clutch disc 87 is adjacent to disc 86 in clutch housing 1. Clutch housing 1 is connected to clutch disc 25 and also sun gear 23 by drum 104. Piston 38 and disc 87 move in housing 1 to engage disc 86. Rear clutch housing 5, integral with shaft 22, encloses piston 27, sliding disc 28 and disc 29. Piston 27 and disc 28 move in housing 5 to engage disc 29. Clutch housing 2 forms a brake drum for brake band 3, supports sliding clutch disc 91, and also is integral with rear sun gear 33. Piston 39 and disc 91 move in housing 2 to engage disc 25. Brake band 3 is operated by piston 108 in cylinder 53. Ring gear 106 is connected by drum 103 to hydraulic cylinder 102 which in turn is integral with output shaft 24.

Planet carrier 35 has a drum 119, cooperating with band 4, which is operated by piston 36 in cylinder 54. Clutch member 6 is a sliding toothed member splined to shaft 24 and engages internal teeth 26.

A light spring 32 tends to engage member 6 with teeth 26 but a heavy spring 37 urges 6 out of engagement when it is energized by hydraulic piston 89 in cylinder 102. When cylinder 102 is not energized with oil pressure, teeth 6 and 26 remain engaged.

*Centrifugal clutch*

Centrifugal clutch 11 has disc 40 driven directly by the input shaft 14. A sliding disc 41 is splined in housing 42 which is connected to the hub 88 through one-way clutch 13 and also to shaft 17 by one-way clutch 10. The disc 40 is engaged only when the speed of housing 42 is sufficient to cause centrifugal weight 97 to rock outwardly against the force of clutch springs not shown.

*Hydraulic system*

Hydraulic pressure is derived from an oil pump consisting of an external gear 43 driven directly from the input shaft 14 by flange 44, and an internal gear 45 which meshes with gear 43 and is supported in housing 46 in a position eccentric with respect to the axis of gear 43. Oil from the sump, not shown, enters the pump through passage 47 and is forced through passage 48 to valve housing 49. From the valve housing 49 oil under pressure is directed to clutch housing 1 through passages 50 and 51, the latter being formed in hub 88.

Pressure for cylinders 53 and 54 is directed through passages 56 and 57, respectively. Pressure for clutch housing 2 is directed through passages 58 and 59, the latter being located in the hub of clutch housing 2. Pressure for clutch housing 5 is directed through passages 60 and 61, the latter being formed in shaft 22 and hub of clutch housing 5. Pressure for disengaging clutch teeth 6 and 26 is through passages 62 and 63, the latter being formed in output shaft 24.

*Control*

Details of the valves and valve housing are not shown as they are not pertinent to the invention. Any suitable control means may be used for effecting shifting through the progressive speed ratios, and the one disclosed is merely an example. In such example, the valve actuating means consists of governor 64, hand lever 65, and accelerator 66. The governor is driven by gears 67 and 68. Governor 64 operates shift valves 79 and 109 through levers 77 and 78 and link 111. Accelerator 66, when depressed, compresses a heavy spring 30 and also by means of bellcrank 52 a light spring 9, which compresses against shoulder 7 on link 111 and opposes movement of the shift valves 79 and 109 into housing 49. Resultant movement of valves 79 and 109 is therefore due to the combined effect of governor 64 and accelerator 66. In neutral position these valves are in the approximate position shown in Fig. 1 and they move into body 49 to accomplish upshifts to various forward speeds.

Hand lever 65 operates lever 82 and may selectively operate lever 83 by well-known mechanism (not shown). When selectively engaged, lever 83 and link 111 permit hand lever 65 to hold the transmission in first or second speed by holding valves 79 and 109 in positions corresponding to those speeds. Lever 82 and link 31 permit hand lever 65 to move valve 84 to one of three positions corresponding to neutral, forward and reverse speeds of the transmission.

The three valves 84, 79 and 109 direct oil pressure through passages 50, 56, 58, 60, 57 and 62 as required to obtain various speeds. Valve 84 is set manually by lever 65 and valves 79 and 109 normally operate automatically as described.

Operation

As soon as the engine starts, oil pump gears 43 and 45 generate pressure but, with hand lever 65 in neutral, there is no drive through the transmission and the front set of gears turns idly. Clutch teeth 6 and 26 are held in engaged position by spring 32 which causes shaft 22 to remain stationary when the vehicle is stationary. Ring gear 19 turns with runner 16 by shaft 17 and flange 18. This turns sun gear 23, drum 104, clutch housing 1 and disc 25 in a backward direction. Even though hand lever 65 is in neutral, brake 4 is held by piston 36 as soon as the engine starts in order to avoid the necessity of gradually engaging multiplied reaction torque in establishing initial drive.

When hand lever 65 is moved to "forward," valve 84 is moved from the position shown in Fig. 1 and directs oil through passage 58 to clutch housing 2. Piston 39 in clutch housing 2 engages clutch members 2, 25 and 91. Teeth 6 and 26 and brake 4 remain engaged as in neutral and the transmission is now in low speed.

If the engine is idling there is still no drive as the fluid coupling does not transmit enough torque to drive the vehicle until the engine is speeded up. Clutch members 2, 25 and 91 connect the two sets of gears in differential relationship so there is a parallel path of power through the transmission in low speed with part of the driving torque delivered directly from the front set to the shaft 24 without passing through the gears of the rear set. Thus, carrier 35 of the second set of gears is the reaction member and is held stationary by brake 4. The drive through the front set of gears is now from shaft 14 to drum 117, impeller 15, runner 16, shaft 17, flange 18, gear 19, planet gear 20, carrier 21, shaft 22, clutch teeth 6 and 26 and finally to shaft 24.

The torque reaction on front sun gear 23 turns it backward and since it is connected to rear sun gear 33, that too turns backward. This tends to turn carrier 35 backward but it is restrained by friction brake 4. As a result, ring gear 106 is driven forward and the portion of the output torque derived therefrom adds to that transmitted through shaft 22 from the front set of gears.

While low speed is obtained by manual control, as described, other forward speeds are engaged automatically as valves 79 and 109 are operated thereafter automatically by means of the combined action of the foot accelerator and the governor.

In second speed, brake band 4 and clutch 2 remain engaged but clutch teeth 6 and 26 release and clutch 5 engages. Carrier 35 remains stationary and since it is now connected by clutch 5 to shaft 22, carrier 21 also comes to a stop. The first or front set of gears is now a reverse overdrive and the second or rear set a reverse underdrive. But since the underdrive ratio is more than the overdrive a net underdrive ratio results with the output at ring gear 106.

In third speed, valves 79 and 109 move to a new position which releases brake 4 but keeps clutch members 2, 25 and 91 in engagement. Piston 108 is energized through passage 56 which engages brake 3. Sun gear 23 is held stationary by brake 3 and the output torque is then derived entirely from the front set of gears. Carrier 21 transmits the output torque through clutch teeth 6 and 26 to output shaft 24. As soon as brake 3 engages, it holds sun gears 23 and 33 stationary but ring gear 106 continues to turn forward. This carries planet gears 34 and carrier 35 forward, but no power is now transmitted through this rear set of gears.

In fourth and fifth speeds, valves 79 and 109 move to new positions. Clutch members 2, 25 and 91 remain engaged. In fourth speed, however, pistons 89 and 27 are energized through passages 62 and 60, respectively. This disengages clutch teeth 6 and 26 and engages clutch members 5, 28 and 29 so that the output torque from the front set of gears is disconnected from shaft 24 and is directed through the rear set of gears. Since sun gear 33 is still held stationary by brake 3, the rear set of gears becomes an overdrive ratio.

The path of power in fourth speed is from the fluid coupling 12, through shaft 17, flange 18, ring gear 19, planet gears 20, carrier 21, shaft 22, clutch housing 5 and disc 28 to disc 29, carrier 35, planet gears 34, ring gear 106, drum 103, cylinder 102 and output shaft 24.

In fourth speed, the front and rear sets of gears are connected in compound relationship.

Changing from third to fourth speed is accomplished without interruption of torque. When piston 27 is energized, clutch members 5, 28 and 29 begin to apply torque to carrier 35 gradually but not until they are fully engaged do clutch teeth 6 and 26 release. Even though spring 37 is compressed by piston 89, it does not exert a force large enough to overcome the friction between teeth 6 and 26 when torque loaded. But when the output shaft drive has built up sufficiently through clutch members 5, 28 and 29 to the rear set of gears, drum 103 and cylinder 102 to output shaft 24, there is no longer sufficient load on teeth 6 and 26 to prevent the force of spring 37 from acting and the teeth then disengage.

Fifth speed is direct through the transmission with no gear reduction. The front set of gears is locked against relative rotation of its members by clutch members 1, 86 and 87. These members are engaged by piston 38 when oil pressure is admitted to clutch housing 1 from valve housing 49, which feeds through passages 50 and 51. This forces the front set to rotate as a whole about the axis of the transmission. Brake 3 releases, but clutch members 2, 25 and 91 and clutch members 5, 28 and 29 remain engaged. This also locks the rear set of gears together so that rear ring 106 also turns at engine speed and there is then a one to one to one drive from ring gear 106 through drum 103 and cylinder 102 to output shaft 24.

In sixth speed, clutch members 1, 86, and 87 and also clutch members 5, 28 and 29 remain engaged, as in fifth speed. Clutch members 2, 25 and 91 are disengaged. Thus, the front set of gears remains locked, but by releasing clutch members 2, 25 and 91 and re-engaging brake 3, the rear set again becomes an overdrive. Since the front set of gears are locked, a one to one drive between shafts 17 and 22 is obtained. From shaft 22 power is transmitted to clutch housing 5 and through disc 29 to carrier 35 which drives planet gears 34 forward. But since sun gear 33 is being held stationary by brake 3, planet gears 34 rotate with carrier 35 and force ring gear 106 forward at a speed faster than that of carrier 35.

Reverse speed is obtained by manual control lever 65 which operates valve 84 to engage clutch members 1, 86 and 87, and 2, 25 and 91. This conditions the gears so that the front set is locked together and the rear set only is working. The drive is from shaft 17 through clutch members 1, 86 and 87 to drum 104, clutch members 2, 25 and 91, and sun gear 33. Rear carrier 35 is held by brake 4 which makes planet gears 34 act as reverse idlers and ring gear 106 is driven backward. The teeth of the front set are not loaded in reverse speed.

Centrifugal clutch

When starting a gasoline or diesel engine driven vehicle from a standstill, slippage occurs at the friction surfaces of the clutch and transmission brake which engage the planetary gear drive. By using a fluid coupling, wear of the friction materials of the clutches and brakes is reduced both when starting and between shifts, because most of the slip then takes place in the fluid coupling. This provides smooth starting and shifting. The slip at the coupling represents power loss, and it is important to reduce this loss to a minimum. This is done by limiting the use of the fluid coupling to starting the vehicle through the first four of the six speeds, and by-passing the coupling with a solid drive in fifth and sixth and also thereafter on down-shifts down to and including low speed.

The operation of this depends on the speed and direction of rotation of sun gear 23 and particularly hub 88. When hub 88 is rotating backward, as in neutral, low and second speed, one-way clutch 13 overruns and so cannot drive centrifugal clutch housing 42. In third and fourth speed hub 88 is stationary and so cannot drive housing 42 in these speeds either. In fifth and sixth speed, however, hub 88 turns forward at the speed of runner 16 as it is locked to the latter by clutch members 1, 86 and 87. One-way clutch 13 now drives housing 42 at engine speed minus whatever slip is present in the hydraulic coupling. As soon as the speed of housing 42 reaches a predetermined speed, e. g. about 1400 R. P. M., weight 97 rocks outwardly and pushes disc 41 to the left so that disc 40 is locked between housing 42 and disc 41. But since disc 40 is connected to the input shaft 14, it is rotating somewhat faster than runner 16, shaft 17, disc 41 and housing 42 and these members therefore pick up speed slightly when engagement takes place.

This causes one-way clutch 13 to overrun and one-way clutch 10 to engage or lock. Consequently, there is now a direct drive from shaft 14 to shaft 17 without benefit of fluid coupling 12. In reverse speed a similar condition occurs. For instance, the drive is first through fluid coupling 12 which, with clutch members 1, 86 and 87 picks up the load smoothly when starting. After clutch members 1, 86 and 87 engage, hub 88 rotates forward and when about 1400 R. P. M. is reached, the centrifugal clutch members 40, 41 and 42 engage and fluid coupling 12 is then by-passed for reverse speed.

Downshifts

Once the centrifugal clutch has been engaged in fifth speed through one-way clutch 13 by the forward rotation of hub 88, centrifugal clutch 11 is not dependent on hub 88 but is maintained in engagement as long as the engine speed exceeds a predetermined centrifugal clutch release speed, regardless of whether hub 88 is stationary, or turning forward or backward. This permits shifting down through the various steps to low gear without relinquishing solid drive and, thus, full engine power is delivered because there is no hydraulic slip.

After the transmission has been engaged in fifth or sixth speed and load conditions reduce the speed so the governor shifts the control valves down to fourth speed position, hub 88 stops rotating. The centrifugal clutch does not disengage, however, as long as the speed of shaft 14 exceeds the engaging speed of the centrifugal clutch since, once engaged, the centrifugally actuated weights 97 continue to be driven by the input coupled clutch disc 40. Likewise, the centrifugal clutch continues to drive as the transmission shifts down into third, second and low speed. If, however, the speed of shaft 14 falls below about 1400 R. P. M., the centrifugal clutch releases and the drive is thereafter through the fluid coupling only.

Downshifts occur when valves 79 and 109 are moved in a direction opposite to that required for upshifts. This is caused by reduced speed, or it may be caused by depressing foot accelerator 66, or by both together. Manual downshift of the valve may also be obtained by hand lever 65 as previously suggested. Shifting down occurs when the various clutches and brakes are engaged and disengaged in the reverse order from that described for upshifts. However, the action of clutch teeth 6 and 26 requires explanation for shifts from fourth to third speed. When this occurs clutch members 5, 28 and 29 release and cylinder 102 is exhausted allowing springs 32 and 37 to push piston 89 to the right end of cylinder 102. The light pressure of spring 32 forces clutch teeth 6 against mating teeth 26, but since the rear planetary gears overdrive, the clutch teeth 6 are rotating faster than clutch teeth 26 and consequently they will not mesh. The beveled ends, shown in Fig. 4, permit these teeth to ratchet. As soon as clutch members 5, 28 and 29 release, however, there is no connection to the output shaft and clutch teeth 26 speed up as the engine is relieved of its load and as soon as the teeth synchronize they engage. Third speed engagement is then complete and the drive is directly from shaft 22 to output shaft 24.

When coasting down hill, the vehicle tends to overrun the engine and, with the accelerator released, the engine acts as a brake in all speeds and thus avoids excessive application of the wheel brakes.

In this disclosure the engine acts as a brake with a solid drive by-passing the fluid coupling in fifth and sixth speeds. In these speeds one-way clutch 10 does not drive when coasting, but the other one-way clutch 13 then drives the engine. When a shift is made to fourth or third speed, hub 88 comes to a stop and, in second and low speeds, turns backward. Both of clutches 10 and 13 then overrun when coasting and the drive to the engine then passes through the fluid coupling. In these four lower speeds the gear ratios are low enough to provide adequate engine braking even though fluid coupling slippage exists.

When push-starting the vehicle as when the starting battery is low, the following occurs: clutch teeth 6 and 26 will be engaged, regardless of the control lever position, because there is no pressure to disengage them. As soon as the vehicle is pushed forward, shaft 22 will turn with output shaft 24. This turns ring gear 19, shaft 17, and runner 16 forward; but, since impeller 15 is stationary, it will offer fluid resistance to the rotation of runner 16 and ring gear 19 and thus permit them to only turn slowly. The resistance offered by ring gear 19 forces sun gear 23 to rotate forward at a speed faster than that of shaft 22 and carrier 21. This drives hub 88 forward which drives clutch housing 42 forward through one-way clutch 13 to engage centrifugal clutch 11. A drive from the wheels to engine is thereby established partly through the fluid coupling and partly through the centrifugal clutch, torque from ring gear 19 reaching the engine shaft 14 through the fluid coupling and torque from sun gear 23 reaching the engine shaft via the centrifugal clutch. The oil feed line to the fluid coupling is provided with a check valve (not shown) to prevent drainage rendering the coupling ineffective after the vehicle has stood idle for a long period.

This unique combination makes it unnecessary to have a second oil pump, as in most other designs, because no oil pressure is needed for push-starting.

The following chart shows the various clutches and brakes engaged in the neutral and various speeds:

|         | Clutches |     |     | Brakes |
| ------- | -------- | --- | --- | ------ |
| Neutral |          |     | 6   | 4      |
| 1st     |          | *2  | 6   | 4      |
| 2nd     |          | 2   | *5  | 4      |
| 3rd     |          | 2   | 6   | *3     |
| 4th     |          | 2   | *5  | 3      |
| 5th     | *1       | 2   | 5   |        |
| 6th     | 1        |     | 5   | *3     |
| Reverse | *1       | *2  |     | 4      |

* Engaged under load—others engage before load is applied.

In the following chart "W" indicates the gear sets which are working in various speeds:

|         | 1st | 2nd | 3rd   | 4th | 5th     | 6th     | Rev.    |
| ------- | --- | --- | ----- | --- | ------- | ------- | ------- |
| 1st set | W   | W   | W     | W   | Locked  | Locked  | Locked. |
| 2nd set | W   | W   | Idles | W   | Locked  | W       | W.      |

I claim:

1. In a variable speed transmission for a self-propelled vehicle having an engine, a power input member, a load member, a fluid coupling connected to step shift gearing for effecting a plurality of drive speed ratios between input and load members; a centrifugal clutch for by-passing said fluid coupling comprising a driving element rotating with the driving element of said fluid coupling, a centrifugally actuated rotatable driven element, a one-way forward driving connection between said clutch driven element and the driven element of said fluid coupling, said gearing including a friction lockup for establishing a one-to-one drive through the gearing, and a one-way forward driving connection between said gearing and the centrifugally actuated driven element of said clutch rendered effective upon engagement of said friction lockup.

2. In a variable speed transmission for a self-propelled vehicle having an engine, a power input member, a load member, a fluid coupling connected to step shift gearing for effecting a plurality of drive speed ratios between said power input and load members; a reaction gear element and a friction lockup for establishing a one-to-one drive through the gearing, a centrifugally actuated clutch, a driving element of said clutch connected for rotation with the driving element of said fluid coupling, a centrifugally actuated driven element of said clutch, a one-way forward driving connection between said reaction gear element and the driven element of said clutch, and a one-way forward driving connection between the driven element of said clutch and the driven element of said fluid coupling.

3. In a motor vehicle drive, an engine shaft, planetary gearing comprising input, output and reaction gear members, a clutch connecting two of said members, a hydrodynamic drive device between the engine shaft and said input member, a centrifugal clutch and a one-way clutch in series between the engine shaft and said input member, and a one-way clutch between the centrifugal clutch and said reaction member, whereby the engine shaft may be drivingly connected to said input member through the hydrodynamic drive when the said clutch connecting two of said gear members is released and through the centrifugal clutch when said clutch between two of said gear members is engaged.

4. In a motor vehicle drive, an engine shaft, planetary gearing having input and output and reaction gear members, a hydrodynamic drive device between the engine shaft and said input member, a centrifugal clutch and a one-way clutch in series between the engine shaft and said input member, a one-way clutch between the centrifugal clutch and another member of the planetary gearing, and a lock-up clutch between two members of said planetary gearing, whereby, with said lock-up clutch released, the engine shaft may be drivingly connected to the planetary gearing by the hydrodynamic drive device and when said lock-up clutch is engaged, the engine shaft is drivingly connected to said planetary gearing by the centrifugal clutch.

5. In a variable speed transmission for a motor vehicle, an engine shaft, at least one planetary gear set consisting of input, output and reaction gear members, a hydrodynamic drive device between the engine shaft and said input gear member, a centrifugal clutch and a one-way clutch in series between the engine shaft and said input gear member, a one-way clutch between the centrifugal clutch and said reaction gear member, a lock-up clutch between said reaction gear and said input gear members, and a brake for holding said reaction gear member, whereby, when the lock-up clutch is released and said brake is applied, the engine shaft may be drivingly connected to a planetary gear set by the hydrodynamic drive device and when the lock-up clutch is engaged and said brake is released, the engine shaft is drivingly connected to a planetary gear set by the centrifugal clutch.

6. In a multispeed planetary gear transmission for a motor vehicle, an engine shaft, a ring gear, a hydrodynamic drive device between the engine shaft and said ring gear, a centrifugal clutch and a one-way clutch in series between the engine shaft and said ring gear, a sun gear, a one-way clutch between the centrifugal clutch and said sun gear, a brake for holding said sun gear, and a lock-up clutch between said sun and ring gears, whereby, when said lock-up clutch is released and said brake is applied, the engine shaft may be drivingly connected to said ring gear by the hydrodynamic drive device and when said lock-up clutch is engaged and said brake is released, the engine shaft is drivingly connected to said ring gear by the centrifugal clutch.

7. In a motor vehicle drive, an engine shaft, a transmission gear member, a hydrodynamic drive device between the engine shaft and said transmission gear member, a centrifugal clutch and one-way clutch in series between the engine and said transmission gear member, a rotatable control member, a one-way clutch between the centrifugal clutch and said control member, means including planetary gearing for successively holding the control member stationary and rotating it forward in successive speed ratios whereby when said control member is held stationary the drive from the engine shaft to the transmission gear member may be through the hydrodynamic drive device, and when said control member is rotated forward above a predetermined speed the drive from the engine shaft to the transmission gear member is through the centrifugal clutch.

8. In a motor vehicle drive, an engine shaft, a transmission gear member, a hydrodynamic drive device between the engine shaft and the transmission gear member, a centrifugal clutch and one-way clutch in series between the engine shaft and the transmission gear member, said transmission gear member overrunning the centrifugal clutch when the latter is not engaged, a rotatable control member for the centrifugal clutch, gearing means for successively holding said control member rotating it in successive speed ratios, and a one-way clutch between said control member and the centrifugal clutch for driving the centrifugal clutch only forwardly, whereby, when said control member is not turning forward, the drive from the engine shaft to the transmission gear member may be through the hydrodynamic drive device, and when the control member is turning forward above a predetermined speed, the drive from the engine shaft to the transmission gear member is through the centrifugal clutch.

9. In a variable speed transmission for a motor vehicle, an engine shaft, planetary gearing, a hydrodynamic input structure connecting the engine shaft to an input member of the planetary gearing, a load structure driven by said planetary gearing, a centrifugal clutch having a centrifugal element and a one-way clutch in series for connecting the engine shaft to said input member, said one-way clutch overrunning when the forward speed of said input member exceeds that of said centrifugal clutch, a second one-way clutch between a second member of said planetary gearing and said centrifugal clutch, the centrifugal element of said clutch being initially rotated forward to actuate its engagement by said second member of said planetary gearing through said second one-way clutch, said second one-way clutch overrunning when said second planetary gear member is not turning forward.

10. In a variable speed transmission for a motor vehicle, an engine shaft, planetary gearing, a hydrodynamic input structure connecting the engine shaft to an input member of the planetary gearing, a load structure driven by said planetary gearing, a centrifugal clutch having a centrifugal element and a one-way clutch in series for connecting the engine shaft to a member of the planetary gearing, said one-way clutch overrunning when the forward speed of said last member exceeds that of the centrifugal clutch, a second one-way clutch between a second member of said planetary gearing and said centrifugal clutch, the centrifugal element of said clutch being initially rotated forward to actuate its engagement by said second member of said planetary gearing through said second one-way clutch, said second one-way clutch overrunning when said second planetary gear member is not turning forward, and means for rotating said second planetary gear member initially backward and subsequently forward.

11. In a variable speed transmission for a motor vehicle, an engine shaft, planetary gearing, a hydrodynamic input structure connecting the engine shaft to an input member of the planetary gearing, a load structure driven by said planetary gearing, said planetary gearing including a ring gear driven by said input structure, a planet carrier connected to said load structure and a sun gear; a centrifugal clutch having a centrifugal element and a one-way clutch in series for transmitting torque from the engine shaft to said ring gear, said one-way clutch overrunning when the forward speed of the ring gear exceeds that of said centrifugal clutch, a second one-way clutch between said sun gear and said centrifugal clutch, the centrifugal element of said clutch being initially rotated forward to actuate its engagement by said sun gear through said second one-way clutch, said second one-way clutch overrunning when said sun gear is not turning forward, said centrifugal clutch after initial engagement being subsequently maintained in engagement by engine shaft rotation above a predetermined speed with its release depending on the reduction of engine shaft speed below said predetermined speed.

12. The combination set forth in claim 11 including means effective in successively higher speed ratios for rotating said sun gear initially backward, for subsequently holding it stationary, and finally for rotating the sun gear forward.

References Cited in the file of this patent

UNITED STATES PATENTS

| | | |
|---|---|---|
| 2,156,041 | Duffield | Apr. 25, 1939 |
| 2,303,975 | Banker | Dec. 1, 1942 |
| 2,371,574 | Swennes | Mar. 13, 1945 |
| 2,381,772 | Pentz | Aug. 7, 1945 |
| 2,418,378 | Voytech | Apr. 1, 1947 |